United States Patent
Cai et al.

(10) Patent No.: US 10,652,897 B1
(45) Date of Patent: May 12, 2020

(54) ASSIGNING CARRIERS TO RADIO PORTS OF A SPLIT RADIO HEAD

(71) Applicant: Sprint Spectrum LP, Overland Park, KS (US)

(72) Inventors: Zheng Cai, Fairfax, VA (US); Justin Sungki Park, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 42 days.

(21) Appl. No.: 16/152,989

(22) Filed: Oct. 5, 2018

(51) Int. Cl.
*H04W 72/04* (2009.01)
*H04W 88/06* (2009.01)

(52) U.S. Cl.
CPC ... *H04W 72/0486* (2013.01); *H04W 72/0453* (2013.01)

(58) Field of Classification Search
CPC .................. H04W 72/0486; H04W 72/0453
See application file for complete search history.

(56) References Cited

U.S. PATENT DOCUMENTS

| | | | |
|---|---|---|---|
| 8,290,530 B2* | 10/2012 | Morita | H04W 52/346 455/115.1 |
| 9,219,594 B2 | 12/2015 | Khlat et al. | |
| 9,572,197 B1* | 2/2017 | Wurtenberger | H04W 88/08 |
| 9,674,800 B2* | 6/2017 | Zhang | H04W 52/346 |
| 10,236,960 B2* | 3/2019 | Xiong | H01Q 5/50 |
| 10,334,662 B2* | 6/2019 | Chen | H04W 52/0216 |
| 2016/0242185 A1* | 8/2016 | Handa | H04W 52/281 |
| 2018/0034499 A1 | 2/2018 | Kwon et al. | |

* cited by examiner

*Primary Examiner* — Rasheed Gidado

(57) ABSTRACT

Assigning carriers to radio ports communicably coupled to a corresponding plurality of antennae of a radio head, wherein the radio head is split into at least first and second split portions, determining a difference between a first power level available to the first carrier via the first set of radio ports and a second power level available to the second carrier via the second set of radio ports, and changing a split of the radio head such that the difference between the first and second power levels is minimized.

20 Claims, 12 Drawing Sheets

---

DETERMINE THAT A POWER LEVEL AVAILABLE TO ONE OR MORE CARRIERS ASSIGNED TO A FIRST SET OF RADIO PORTS OF A RADIO HEAD IS BELOW A THRESHOLD, WHEREIN THE THRESHOLD IS BASED ON A DIFFERENCE BETWEEN THE FIRST POWER LEVEL AND A SECOND POWER LEVEL AVAILABLE TO ANOTHER ONE OR MORE CARRIERS ASSIGNED TO A SECOND SET OF RADIO PORTS OF THE RADIO HEAD, OR ON A POWER REQUIREMENT OF THE FIRST ONE OR MORE CARRIERS
610

↓

CHANGE A SPLIT OF THE RADIO HEAD SUCH THAT THE FIRST POWER LEVEL MEETS THE THRESHOLD, WHEREIN CHANGING THE SPLIT COMPRISES ADJUSTING A NUMBER OF RADIO PORTS IN EACH OF THE FIRST AND SECOND SETS OF RADIO PORTS OF THE RADIO HEAD, SUCH THAT EITHER THE DIFFERENCE BETWEEN THE FIRST AND SECOND POWER LEVELS IS MINIMIZED, OR THE POWER REQUIREMENT OF THE FIRST ONE OR MORE CARRIERS IS SATISFIED
620

DETERMINE THAT A POWER LEVEL AVAILABLE TO ONE OR MORE CARRIERS ASSIGNED TO A FIRST SET OF RADIO PORTS OF A RADIO HEAD IS BELOW A THRESHOLD, WHEREIN THE THRESHOLD IS BASED ON A DIFFERENCE BETWEEN THE FIRST POWER LEVEL AND A SECOND POWER LEVEL AVAILABLE TO ANOTHER ONE OR MORE CARRIERS ASSIGNED TO A SECOND SET OF RADIO PORTS OF THE RADIO HEAD, OR ON A POWER REQUIREMENT OF THE FIRST ONE OR MORE CARRIERS
610

↓

CHANGE A SPLIT OF THE RADIO HEAD SUCH THAT THE FIRST POWER LEVEL MEETS THE THRESHOLD, WHEREIN CHANGING THE SPLIT COMPRISES ADJUSTING A NUMBER OF RADIO PORTS IN EACH OF THE FIRST AND SECOND SETS OF RADIO PORTS OF THE RADIO HEAD, SUCH THAT EITHER THE DIFFERENCE BETWEEN THE FIRST AND SECOND POWER LEVELS IS MINIMIZED, OR THE POWER REQUIREMENT OF THE FIRST ONE OR MORE CARRIERS IS SATISFIED
620

ASSIGNING CARRIERS TO RADIO PORTS OF A SPLIT RADIO HEAD

TECHNICAL BACKGROUND

As wireless networks evolve and grow, there are ongoing challenges in providing high-quality service to increasing numbers of wireless devices in various coverage areas of a wireless network. One approach to improving service quality and coverage is to provide a plurality of carriers on a radio-air interface deployed by a base station or access node. The plurality of carriers utilize different frequency bands or sub-bands. Further, one or more antennae of the access node may be configured to deploy the different carriers in various configurations that enable wireless devices and access nodes to communicate using a combination of carriers. For example, data transmitted across two or more "component carriers" may be aggregated using carrier aggregation. Further, different carriers may be targeted towards different parts of a geographical coverage area of the wireless network or towards pairs of wireless devices using techniques such as, for example, multiple-input-multiple-output (MIMO) or beamforming. The one or more antennae of an access node may be controlled by a radio head, with each antenna being communicatively coupled to a radio port on the radio head. To increase the number of carriers deployed by an access node, the radio head may be split or divided into at least two portions. This allows additional carriers to utilize the power of the radio head and antenna ports thereof without reducing the bandwidth. Further, as smaller or low-powered access nodes (i.e. small cells) are deployed in increasing numbers throughout heterogenous wireless networks, additional carriers of different frequencies may need to be provided by low-power radio heads.

Overview

Exemplary embodiments described herein include systems, methods, and processing nodes for assigning carriers to radio ports of a radio head. An exemplary method described herein for assigning carriers to radio ports comprises assigning a first carrier deployed by an access node to a first set of radio ports communicably coupled to a corresponding first plurality of antennae of the access node via a radio head, wherein the first set of radio ports comprises a first split portion of the radio head, assigning a second carrier deployed by the access node to a second set of radio ports communicably coupled to a corresponding second plurality of antennae of the access node via the radio head, wherein the second set of radio ports comprises a second split portion of the radio head, determining a difference between a first power level available to the first carrier via the first set of radio ports and a second power level available to the second carrier via the second set of radio ports, and changing a split of the radio head such that the difference between the first and second power levels is minimized.

An exemplary system described herein for assigning carriers to radio ports in a wireless network includes an access node configured to deploy a plurality of carriers, a radio head coupled to the access node, the radio head comprising a plurality of radio ports coupled to a corresponding plurality of antennae of the access node, and a processor coupled to the access node. The processor may be configured to perform operations comprising assigning a first carrier deployed by the access node to a first set of radio ports of the radio head, assigning a second carrier deployed by the access node to a second set of radio ports of the radio head, determining that a first power level available to the first carrier via the first set of radio ports is lower than a threshold, and changing a split of the radio head such that the first power level meets the threshold. Changing the split of the radio head comprises increasing a number of radio ports in the first set of radio ports.

An exemplary processing node described herein for assigning carriers to radio ports in a wireless network is configured to perform operations comprising assigning a first carrier deployed by an access node to a first set of radio ports communicably coupled to a corresponding first plurality of antennae of the access node via a radio head, wherein the first set of radio ports comprises a first split portion of the radio head, assigning a second carrier deployed by the access node to a second set of radio ports communicably coupled to a corresponding second plurality of antennae of the access node via the radio head, wherein the second set of radio ports comprises a second split portion of the radio head, determining a difference between a first power level available to the first carrier via the first set of radio ports and a second power level available to the second carrier via the second set of radio ports, and changing a split of the radio head such that the difference between the first and second power levels is minimized.

BRIEF DESCRIPTION OF THE DRAWINGS

FIG. 6 depicts an exemplary method for assigning carriers to radio ports.

DETAILED DESCRIPTION

Figure 1:
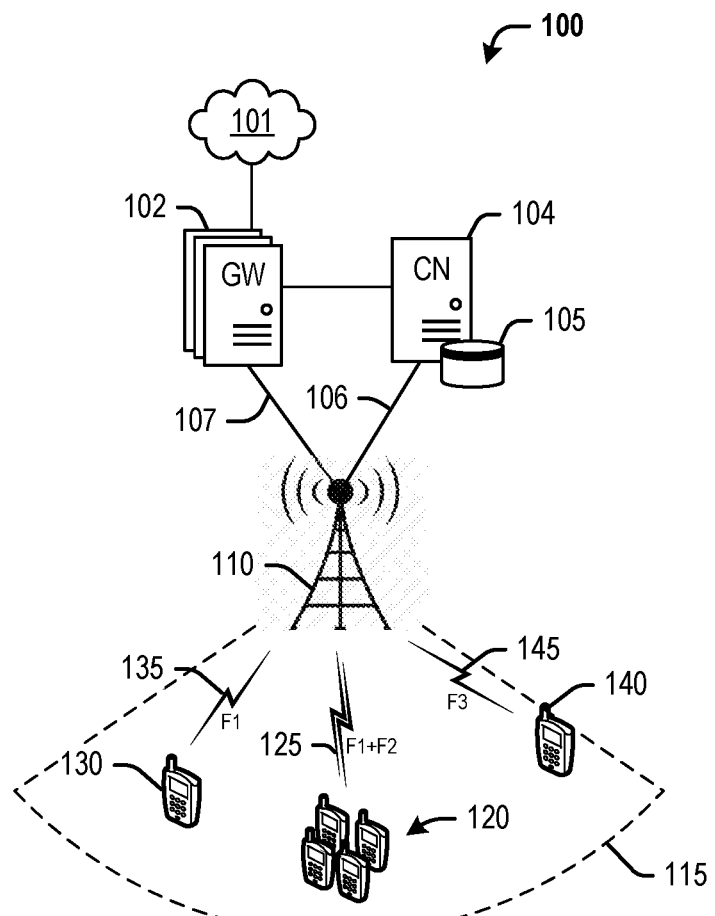
FIG. 1 depicts an exemplary system for assigning carriers to radio ports.

Exemplary embodiments illustrated herein include systems, methods, and processing nodes for assigning carriers to radio ports. The carriers comprise portions of a radiofrequency (RF) bandwidth that is dedicated for wireless communication, such as frequency bands or sub-bands reserved for cellular communication. For example, a carrier in a long-term evolution (LTE) wireless network can comprise a 20 MHz channel of a 1.8 GHz, 1.9 GHz, or 2.5 GHz frequency band. A carrier in a 5G new radio (NR) wireless network can comprise a channel in the range of 5 MHz to 50 MHz of a frequency band in the range between 3 GHz to 100

GHz (also known as millimeter wave bands). Other types of carriers will be evident to those having ordinary skill in the art in light of this disclosure. Further, one or more carriers may be deployed by an access node or base station via one or more antennae of the access node or base station. For example, an access node may comprise, among other components, a plurality of radio ports communicatively coupled to a corresponding plurality of antennae. The plurality of antennae may be configured to transmit data to (and receive data from) one or more wireless devices within a coverage area of the access node. The data may be transmitted/received within radio frames or subframes that are configured within said carriers. Thus, a single carrier may be used to communicate data to and from a plurality of wireless devices that are configured to communicate using the frequencies of said single carrier. Further, the antennae may be arranged such that one or more "sectors" are created within the coverage area of the access node, and a plurality of carriers may be deployed within each of the one or more sectors.

In an exemplary embodiment, the access node further comprises a radio head that houses the radio ports, along with transceivers and additional components that enable communication via said plurality of antennae. For example, each antenna is communicatively coupled to a radio port, and one or more carriers are assigned to a radio port, enabling deployment of the one or more carriers from said each antenna via the corresponding radio port. Further, the radio head may have a maximum power available to each port. For example, in an LTE system, an exemplary radio head with 8 transmit antennae and 8 receive antennae (hereinafter referred to as an "8T8R radio head") may provide a maximum total power of 160 watts (W), and a maximum power per port of 20 W per radio port, for each of its 8 radio ports. In this example, assigning a single carrier to a radio port results in a maximum power of 20 W per carrier per port, assigning two carriers to a radio port results in a maximum power of 10 W per carrier per port, assigning three carriers to a radio port results in a maximum power of 6.67 W per carrier per port, and assigning four carriers to a radio port results in a maximum power of 5 W per carrier per port. Further, this exemplary radio head may have a maximum bandwidth of 60 MHz. Thus, utilizing the radio head to deploy three carriers results in a bandwidth of 20 MHz per carrier, and utilizing the radio head to deploy four carriers results in a bandwidth of 15 MHz per carrier.

In exemplary embodiments described herein, a radio head may be "split", i.e. radio ports of a radio head may be divided into two or more sets. While the total power of the radio head continues to be divided evenly between the radio ports, each radio port in each set is able to access the full bandwidth. For example, the exemplary 8T8R radio head described above (with 8 radio ports) may be split into a first split portion comprising 4 radio ports and a second split portion comprising 4 radio ports. The first split portion (comprising, for example, radio ports 1-4) is able to utilize 50% of the total power of the radio head, and is further able to utilize 100% of the bandwidth at any given time (i.e., instantaneous bandwidth or IBW). Similarly, the second split portion (comprising, for example, radio ports 5-8) is able to utilize 50% of the total power of the radio head, and is further able to utilize 100% of the IBW. In other words, a carrier that is assigned to the first split portion (i.e., all of radio ports 1-4) is provided with a composite power level that is 50% of the total power provided by the radio head. Given 20 W per radio port, the composite power level for the carrier is then 80 W. Similarly, a carrier that is assigned to the second split portion (i.e., all of radio ports 5-8) is provided with a composite power level of 80 W. Thus, exemplary embodiments described herein include methods, systems, and processing nodes configured to adjust or change a split of a radio head so as to adjust a composite power available to one or more carriers that are assigned to a set of radio ports.

For example, a method for assigning carriers to radio ports comprises assigning a first carrier deployed by an access node to a first set of radio ports communicably coupled to a corresponding first plurality of antennae of the access node via a radio head, wherein the first set of radio ports comprises a first split portion of the radio head, assigning a second carrier deployed by the access node to a second set of radio ports communicably coupled to a corresponding second plurality of antennae of the access node via the radio head, wherein the second set of radio ports comprises a second split portion of the radio head, determining a difference between a first power level available to the first carrier via the first set of radio ports and a second power level available to the second carrier via the second set of radio ports, and changing a split of the radio head such that the difference between the first and second power levels is minimized. The radio head has a maximum power level comprising at least a sum of the first and second power levels. Further, the first power level may comprise a composite power level of all the radio ports available to the first carrier, and the second power level may comprise a composite power level of all the radio ports available to the second carrier. Thus, changing the split of the radio head comprises changing a number of radio ports in each of the first and second split portion, which would in turn result in a different composite power level for each carrier.

In an exemplary embodiment, the first and second carriers are both component carriers in a carrier-aggregation mode of operation. The carrier aggregation mode utilizes one carrier as a primary carrier, and the other carrier as the secondary carrier, and resources from the one carrier and the other carrier are combined to enable communications between an access node and one or more wireless devices attached thereto. For carrier aggregation to work successfully, each component carrier must have similar composite power levels, such that the one or more wireless devices using the carrier aggregation mode of operation are able to access both carriers from their specific locations. Further, the method includes assigning a third carrier to the first set of radio ports, wherein one half of the first power level is available to each of the first and third carriers via the first set of radio ports, and wherein changing the split of the radio head comprises increasing a number of radio ports in the first split portion and reducing a number of radio ports in the second split portion. Thus, a difference in the composite power level available to each of the first three carriers is minimized. The method further includes assigning a fourth carrier to the first set of radio ports, and wherein changing the split of the radio head further comprises further increasing the number of radio ports in the first split portion and further reducing the number of radio ports in the second split portion, so as to minimize a difference in the composite power level for each carrier.

In an exemplary embodiment, changing a split of the radio head is based on a weighted power requirement of each of the first and second carriers. For example, the first carrier may have a greater-weighted power requirement than the second carrier, such that changing a split of the radio head comprises increasing a number of radio ports in the first split portion and reducing a number of radio ports in the second split portion. The weighted power requirement for each of the first and second carriers may be based on at least a usage of said each of the first and second carriers. Alternatively or in addition, the weighted power requirement may be based on at least one of the first and second carriers being a component carrier in a carrier aggregation mode of operation. For example, as described above, a primary or secondary component carrier may have a higher-weighted power requirement than other carriers, such as non-aggregated carriers.

In another exemplary embodiment, changing a split of the radio head is based on a priority of the carrier. For example, carriers may be prioritized based on frequency. For example, carriers that utilize higher frequencies may provide a higher throughput than low-frequency carriers, whereas low frequency carriers have better propagation characteristics. Thus, carriers utilizing different frequency bands (or sub-bands) may be ranked on a spectrum between these two characteristics, based on the requirements of a wireless network operator, or based on requirements of wireless devices in a coverage area or sector of an access node. In further embodiments described herein, a presence or number of relay wireless devices may be a determining factor for a power requirement of a carrier. For example, one or more wireless devices attached to a serving access node may be configured to relay communications between the access node and a second wireless device. In this exemplary embodiment, the second wireless device may be communicatively coupled to the wireless device, either via an air interface deployed by the wireless device, or via a second access node (such as a small access node) communicatively coupled to the wireless device. In either case, upon determining that one or more (or a threshold number of) wireless devices are configured as relays for one or more second (or end-user) wireless devices, one or more carriers selected for this type of relay communication may be designated as having a higher power requirement than other carriers that are selected for communication with non-relay wireless devices. In an exemplary embodiment, a high frequency carrier may be assigned as a carrier (or a component carrier) for relay wireless devices. The determination of the carrier (and power requirement thereof) may be based on an indicator from the relay wireless device that the relay wireless device is functioning as a relay based on, for example, a preference for relay wireless devices to be provided with a high throughput. In another exemplary embodiment, a mobility of wireless device (or relay wireless device) may be used as a factor in determining a power requirement of a carrier utilized to communicate with said wireless device (or relay wireless device). For example, while a stationary relay may be assigned a high-frequency carrier based on the assumption that it will relay services to numerous wireless devices attached thereto, a mobile relay may be assigned a low-frequency carrier based on the assumption that it will require a large coverage area to reliably relay services to other wireless devices attached thereto.

In another exemplary embodiment, a system for assigning carriers to radio ports in a wireless network includes an access node configured to deploy a plurality of carriers, a radio head coupled to the access node, the radio head comprising a plurality of radio ports coupled to a corresponding plurality of antennae of the access node, and a processor coupled to the access node. The processor may be configured to perform operations comprising assigning a first carrier deployed by the access node to a first set of radio ports of the radio head, assigning a second carrier deployed by the access node to a second set of radio ports of the radio head, determining that a first power level available to the first carrier via the first set of radio ports is lower than a threshold, and changing a split of the radio head such that the first power level meets the threshold. Changing the split of the radio head comprises increasing a number of radio ports in the first set of radio ports. For example, the first set of radio ports comprises a first split portion of the radio head, and the second set of radio ports comprises a second split portion of the radio head. Further, the radio head has a maximum power level comprising at least a sum of the first power level associated with the first set of radio ports and a second power level associated with the second set of radio ports. Thus, changing the split of the radio head can include reducing a number of radio ports in the second set of radio ports, such that the first power level is increased and the second power level is decreased. Further, determining that the first power level is lower than the threshold can include obtaining a weighted power requirement of the first carrier. Alternatively or in addition, determining that the first power level is lower than the threshold can include determining that a difference between the first power level available to the first carrier via the first set of radio ports and a second power level available to the second carrier via the second set of radio ports exceeds a threshold. In this case, changing the split of the radio head such that the first power level meets the threshold further comprises changing the numbers of radio ports in the first and second sets such that the difference between the first and second power levels is minimized.

In yet another exemplary embodiment, a processing node for assigning carriers to radio ports in a wireless network is configured to perform operations comprising assigning a first carrier deployed by an access node to a first set of radio ports communicably coupled to a corresponding first plurality of antennae of the access node via a radio head, wherein the first set of radio ports comprises a first split portion of the radio head, assigning a second carrier deployed by the access node to a second set of radio ports communicably coupled to a corresponding second plurality of antennae of the access node via the radio head, wherein the second set of radio ports comprises a second split portion of the radio head, determining a difference between a first power level available to the first carrier via the first set of radio ports and a second power level available to the second carrier via the second set of radio ports, and changing a split of the radio head such that the difference between the first and second power levels is minimized. The radio head may be configured with a maximum bandwidth, and each split portion is configured to utilize the maximum bandwidth. Further, changing the split of the radio head comprises changing a number of radio ports in the first and second sets of radio ports, as further described above.

These and other embodiments are further described herein and with reference to FIGS. 1-14.

FIG. 1 depicts an exemplary system for assigning carriers to radio ports. System 100 comprises a communication network 101, gateway 102, controller node 104, access node 110, and wireless devices 120, 130, and 140. In this exemplary embodiment, access node 110 may be a macrocell access node configured to deploy one or more carriers utilizing one or more frequency bands or sub-bands, such as a first carrier utilizing a first frequency band F 1, a second carrier utilizing a second frequency band F2, and a third carrier utilizing a third frequency band F3. Frequency bands F1, F2, and F3 may be any frequency band or sub-band comprising a plurality of frequencies within a band class reserved for cellular communication. For example, frequency bands in a long-term evolution (LTE) wireless network can occupy frequencies at or 1.8 GHz, 1.9 GHz, or 2.5 GHz, and can include channel bandwidths in the range of 20 MHz. A carrier in a 5G new radio (NR) wireless network can comprise channels in the range of 5 MHz to 50 MHz of a frequency band in the range between 3 GHz to 100 GHz (also known as millimeter wave bands). Furthermore, carriers on frequency bands F1, F2, and F3 may be deployed using different types of duplexing modes. For example, carriers utilizing frequency F1 (or other frequencies occupying the first frequency band class) may be deployed by access node 110 utilizing a time division duplexing (TDD) mode or a frequency division duplexing (FDD) mode. Other types of carriers will be evident to those having ordinary skill in the art in light of this disclosure. Further, other combinations of macrocell access nodes, small cell access nodes, and carriers or frequency band classes deployed therefrom may be evident to those having ordinary skill in the art in light of this disclosure.

The one or more carriers may be deployed by access node 110 via one or more antennae of access node 110. For example, as further described herein, access node 110 may comprise a plurality of radio ports communicatively coupled to a corresponding plurality of antennae. The plurality of antennae may be configured to transmit data to (and receive data from) one or more wireless devices within a coverage area of access node 110, such as wireless devices 120, 130, 140. The data may be transmitted/received within radio frames or subframes that are configured within said carriers. Thus, a single carrier may be used to communicate data to and from a plurality of wireless devices that are configured to communicate using the frequencies of said single carrier. Further, the antennae may be arranged such that one or more "sectors" are created within the coverage area of the access node, and a plurality of carriers may be deployed within each of the one or more sectors. For example, as illustrated in FIG. 1, a sector 115 is created by an arrangement of antennae of access node 110, such that wireless devices 120, 130, 140 are provided with wireless service (or "served") by access node 110. Wireless device 130 is illustrated as being in communication with access node 110 via a wireless communication link 135 utilizing frequency band F1, and wireless device 140 is illustrated as being in communication with access node 110 via a wireless communication link 145 utilizing frequency band F3. Further, as described herein, certain wireless devices, such as wireless devices 120, may be capable of carrier aggregation, which utilizes a combination of component carriers to transmit data, usually including a primary component carrier and one or more secondary component carriers. In this embodiment, wireless devices 120 are illustrated as being in communication with access node 110 via a wireless link 125 that utilizes at least two carriers, F1 and F2.

As further described herein, access node 110 may comprise a radio head that houses the radio ports that are coupled to the plurality of antennae, along with transceivers and additional components that enable communication via said plurality of antennae. For example, each antenna is communicatively coupled to a radio port, and the one or more carriers are assigned to a radio port, enabling deployment of the one or more carriers from said each antenna via the corresponding radio port. Further, the radio head may have a maximum power available to each port. For example, in an LTE system, an exemplary radio head with 8 transmit antennae and 8 receive antennae (hereinafter referred to as an "8T8R radio head") may provide a maximum total power of 160 watts (W), and a maximum power per port of 20 W per radio port, for each of its 8 radio ports. In this example, assigning a single carrier to a radio port results in a maximum power of 20 W per carrier per port, assigning two carriers to a radio port results in a maximum power of 10 W per carrier per port, assigning three carriers to a radio port results in a maximum power of 6.67 W per carrier per port, and assigning four carriers to a radio port results in a maximum power of 5 W per carrier per port. Further, this exemplary radio head may have a maximum bandwidth of 60 MHz. Thus, utilizing the radio head to deploy three carriers results in a bandwidth of 20 MHz per carrier, and utilizing the radio head to deploy four carriers results in a bandwidth of 15 MHz per carrier.

Further, the radio head may be "split", i.e. radio ports of a radio head may be divided into two or more sets. While the total power of the radio head continues to be divided evenly between the radio ports, each radio port in each set is able to access the full bandwidth. For example, the exemplary 8T8R radio head described above (with 8 radio ports) may be split into a first split portion comprising 4 radio ports and a second split portion comprising 4 radio ports. The first split portion (comprising, for example, radio ports 1-4) is able to utilize 50% of the total power of the radio head, and is further able to utilize 100% of the bandwidth at any given time (i.e., instantaneous bandwidth or IBW). Similarly, the second split portion (comprising, for example, radio ports 5-8) is able to utilize 50% of the total power of the radio head, and is further able to utilize 100% of the IBW. Thus, access node 110 (or processing nodes communicatively coupled thereto) may be configured to adjust or change a split of a radio head so as to adjust a power available to one or more carriers that are assigned to a set of radio ports. For example, a first carrier F1 deployed by access node 110 may be assigned to a first set of radio ports communicably coupled to a corresponding first plurality of antennae of the access node 110 via a radio head, wherein the first set of radio ports comprises a first split portion of the radio head. Similarly, a second carrier F2 deployed by the access node 110 to a second set of radio ports communicably coupled to a corresponding second plurality of antennae of the access node 110 via the radio head, wherein the second set of radio ports comprises a second split portion of the radio head. Thus, each of the first and second carriers are provided with a composite power level that is 50% of the total power provided by the radio head.

Access node 110 may further be configured to determine a difference between a first power level available to the first carrier F1 via the first set of radio ports and a second power level available to the second carrier F2 via the second set of radio ports, and change a split of the radio head such that the difference between the first and second power levels is minimized. In other words, if the first carrier has a disproportionately smaller amount of available power than the second carrier, then the split of the radio head is changed such that a more even split of power is made available to each carrier. Thus, changing the split of the radio head may include changing a number of radio ports in each of the first and second split portions. Further, a third carrier F3 may be assigned to the first set of radio ports, such that one half of the first power level is available to each of the first and third carriers via the first set of radio ports. In this instance, changing the split of the radio head can include increasing a number of radio ports in the first split portion and reducing a number of radio ports in the second split portion. In additional embodiments, access node 110 may determine that the first power level is lower than a threshold, and change a split of the radio head such that the first power level meets the threshold. The threshold may further be based on a weighted power requirement of one or more carriers. A power requirement of a carrier may be weighted on, for example, a usage of the carrier, whether or not the carrier is a component carrier in a carrier aggregation mode of operation, whether or not the carrier is serving a relay, a throughput of additional wireless devices on the carrier, a priority of the carrier (based on, for example, a throughput or propagation characteristic of the carrier), etc. For example, with reference, to FIG. 1, carriers F1 and F2 are component carriers in carrier-aggregated wireless link 125. One of carriers F1 and F2 may be a primary component carrier while the other carrier is the secondary component carrier, with resources from both carriers being combined to enable communication with wireless devices 120. For carrier aggregation to work successfully, each component carrier must have similar composite power levels, such that the one or more wireless devices using the carrier aggregation mode of operation are able to access both carriers from their specific locations. Thus, a component carrier (whether F1 or F2 or both) may have a higher-weighted power requirement than other carriers, such as F3. Alternatively or in addition, a priority of a carrier may be based on the frequency (or band class) occupied by a carrier. For example, a carrier may have different propagation and throughput characteristics than another carrier operating within a different frequency or band class. Given that low frequency carriers have better propagation characteristics and high-frequency carriers have higher throughputs, a plurality of carriers, each utilizing a range of frequencies (herein referred to as a frequency band or sub-band), may be ranked on a spectrum between these two characteristics, and a radio head is split (or the split is adjusted) to provide increased power for higher-ranked carriers.

Access node 110 can be any network node configured to provide communication between wireless devices 120, 130, 140 and communication network 101, including standard access nodes such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. Access node 110 can comprise a processing node, i.e. a processor, memory, and associated circuitry to execute or direct the execution of computer-readable instructions to perform operations such as those further described herein with respect to FIGS. 2 and 3. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown), using a wireless link or a wired link such as an X2 link.

Wireless devices 120, 130, 140 may be any device, system, combination of devices, or other such communication platform capable of communicating wirelessly with access node 110 using one or more frequency bands deployed therefrom. Each of wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121-124. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as carriers deployed by access node 110 and assignments thereof to radio ports of access node 110, device capabilities of wireless devices 120, 130, 140, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, controller node 104, and/or network 101.

Figure 2:
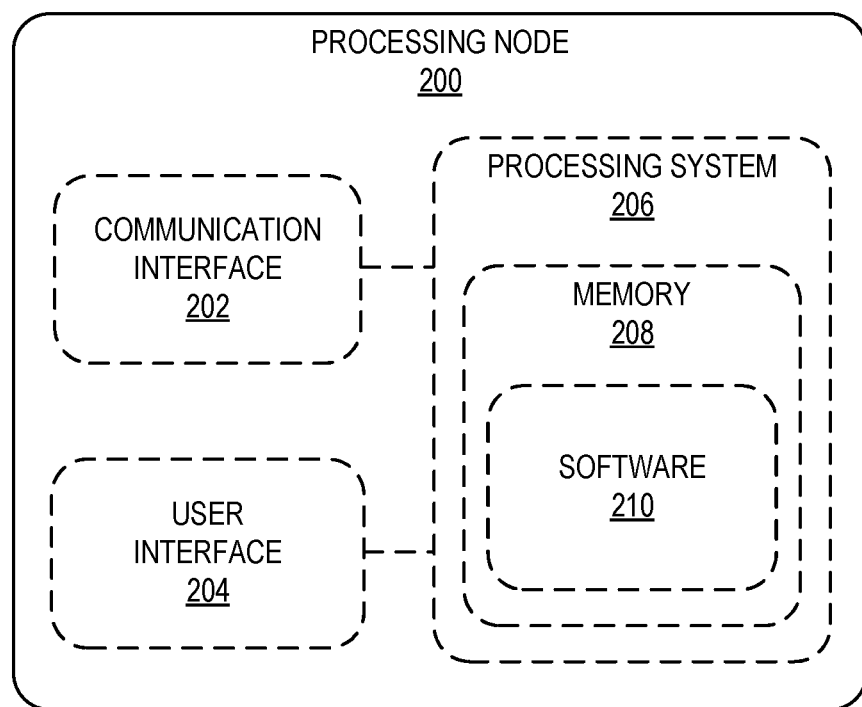
FIG. 2 depicts an exemplary processing node for assigning carriers to radio ports.

FIG. 2 depicts an exemplary processing node for assigning carriers to radio ports. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for performing transmission power control operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
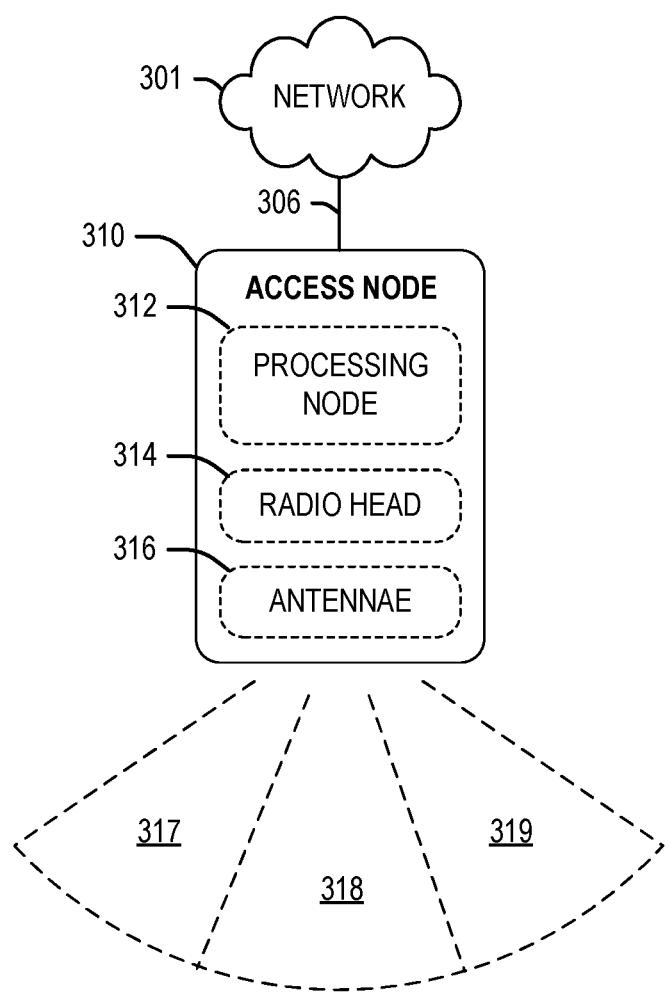
FIG. 3 depicts an exemplary access node for assigning carriers to radio ports.

FIG. 3 depicts an exemplary access node 310 for assigning carriers to radio ports. Access node 310 may comprise, for example, a macro-cell access node, such as access node 110 described with reference to FIG. 1. Access node 310 is illustrated as comprising a processing node 312 (which includes at least a microprocessor and a storage memory as described above with reference to FIG. 2), a radio head 314, and antennae 316. Processing node 312 is configured to execute instructions as further described herein, while radio head 314 may comprise a plurality of radio ports communicatively coupled to a corresponding plurality of antennae 315, thereby enabling wireless communication with wireless devices attached to access node 310. For example, access node is configured to deploy one or more carriers utilizing one or more frequency bands or sub-bands comprising a plurality of frequencies within a band class reserved for cellular communication, such as 20 MHz bandwidths around 1.8 GHz, 1.9 GHz, or 2.5 GHz in LTE systems, millimeter wave bands in 5G NR systems, and so on. These carriers are assigned to one or more radio ports in radio head 314, and deployed in a wireless air interface via antennae 316. Antennae 316 may be arranged such that one or more sectors 317, 318, 319 are created within the coverage area of the access node 310, and one or more carriers may be deployed within each sector. For example, each of sectors 317, 318, and 319 is created by an arrangement of one or more antennae 316.

Figure 4:
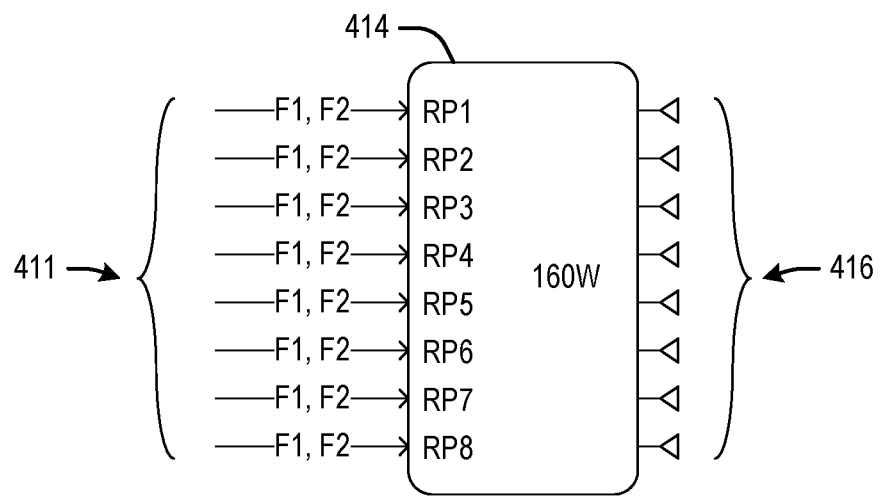
FIG. 4 depicts an exemplary assignment of two carriers to radio ports of a radio head that is not split.

FIG. 4 depicts an exemplary assignment of two carriers to radio ports of a radio head that is not split. In this exemplary embodiment, a radio head 414 of an access node houses 8 radio ports labeled RP1 to RP8, along with transceivers and additional components (not shown) that enable communication via a plurality of antennae 416. For example, each antenna 416 is communicatively coupled to one of radio ports RP1-RP8, and one or more carriers 411 are assigned to each radio port, enabling deployment of the one or more carriers 411 from said antennae 416 via the corresponding radio port. In this embodiment, carriers F1 and F2 are assigned to each radio port. Further, the radio head may have a maximum power available to each radio port. For example, the illustrated radio head 414 may be an 8T8R radio head in an LTE system, and is configured to provide a maximum total power of 160 watts (W), and a maximum power per port of 20 W per radio port, for each of its 8 radio ports. Thus, assigning a single carrier to a radio port results in a maximum power of 20 W per carrier per port, assigning two carriers to a radio port results in a maximum power of 10 W per carrier per port, assigning three carriers to a radio port results in a maximum power of 6.67 W per carrier per port, and assigning four carriers to a radio port results in a maximum power of 5 W per carrier per port. Further in this embodiment, each of carriers F1 and F2 is assigned to all 8 radio ports RP1-RP8. Thus, each carrier is provided with at least 80 W of composite power level (given 8 ports at 10 W per carrier per port). Further, this exemplary radio head may have a maximum instantaneous bandwidth (IBW) of 60 MHz. Thus, utilizing the radio head to deploy two carriers results in an IBW of 30 MHz per carrier, which is more than adequate for LTE bandwidths that are typically 20 MHz per carrier.

Figure 5:
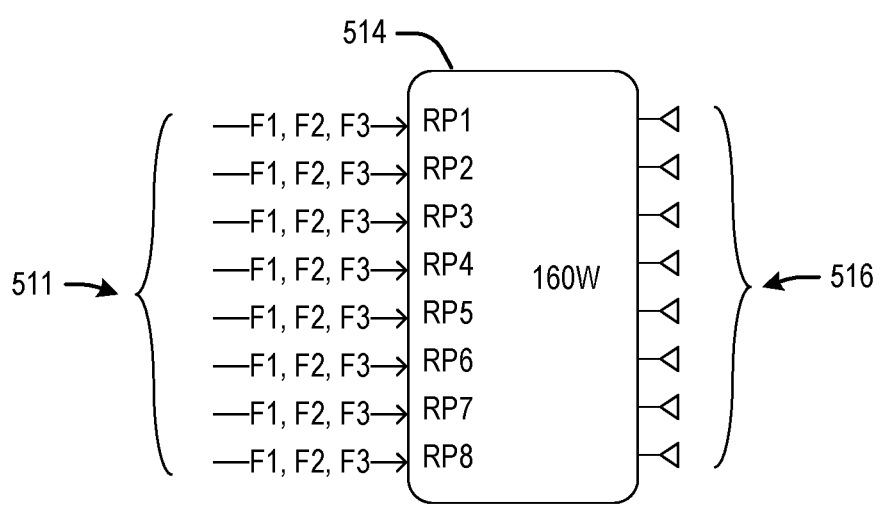
FIG. 5 depicts an exemplary assignment of three carriers to radio ports of a radio head that is not split.

FIG. 5 depicts an exemplary assignment of three carriers to radio ports of a radio head that is not split. In this exemplary embodiment, a radio head 514 of an access node houses 8 radio ports labeled RP1 to RP8, along with transceivers and additional components (not shown) that enable communication via a plurality of antennae 516. For example, each antenna 516 is communicatively coupled to one of radio ports RP1-RP8, and one or more carriers 511 are assigned to each radio port, enabling deployment of the one or more carriers 511 from said antennae 516 via the corresponding radio port. In this embodiment, carriers F1, F2, and F3 are assigned to each radio port. Further, the radio head may have a maximum power available to each radio port. For example, the illustrated radio head 514 may be an 8T8R radio head in an LTE system, and is configured to provide a maximum total power of 160 watts (W), and a maximum power per port of 20 W per radio port, for each of its 8 radio ports. Thus, assigning a single carrier to a radio port results in a maximum power of 20 W per carrier per port, assigning two carriers to a radio port results in a maximum power of 10 W per carrier per port, assigning three carriers to a radio port results in a maximum power of 6.67 W per carrier per port, and assigning four carriers to a radio port results in a maximum power of 5 W per carrier per port. Further in this embodiment, each of carriers F1, F2, and F3 is assigned to all 8 radio ports RP1-RP8. Thus, each carrier is provided with 53 W of composite power (given 8 ports at 6.67 W per carrier per port). Further, this exemplary radio head may have a maximum instantaneous bandwidth (IBW) of 60 MHz. Thus, utilizing the radio head to deploy three carriers results in an IBW of 20 MHz per carrier, which is adequate for LTE bandwidths that are typically 20 MHz per carrier.

In exemplary embodiments described herein, a radio head may be "split", i.e. radio ports of a radio head may be divided into two or more sets. While the total power of the radio head continues to be divided evenly between the radio ports, each radio port in each set is able to access the full bandwidth. For example, the exemplary 8T8R radio head described above (with 8 radio ports) may be split into a first split portion comprising 4 radio ports and a second split portion comprising 4 radio ports. The first split portion (comprising, for example, radio ports 1-4) is able to utilize 50% of the total power of the radio head, and is further able to utilize 100% of the bandwidth at any given time (i.e., instantaneous bandwidth or IBW). Similarly, the second split portion (comprising, for example, radio ports 5-8) is able to utilize 50% of the total power of the radio head, and is further able to utilize 100% of the IBW. A carrier that is assigned to the first split portion (i.e., all of radio ports 1-4) is provided with a composite power level that is 50% of the total power provided by the radio head. Given 20 W per radio port, the composite power level for the carrier is then 80 W. Similarly, a carrier that is assigned to the second split portion (i.e., all of radio ports 5-8) is provided with a composite power level of 80 W. Thus, exemplary embodiments described herein include methods, systems, and processing nodes configured to adjust or change a split of a radio head so as to adjust or equalize a composite power level available to one or more carriers that are assigned to a set of radio ports.

FIG. 6 depicts an exemplary method for assigning carriers to radio ports including changing a split of a radio head. The method of FIG. 6 may be implemented by a processing node coupled to an access node (such as access node 110), a controller node (such as controller node 104), or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that a power level available to one or more carriers assigned to a first set of radio ports of a radio head is below a threshold. For example, a first carrier may be assigned to a first set of radio ports of communicably coupled to a corresponding first plurality of antennae of the access node via a radio head, wherein the first set of radio ports comprises a first split portion of the radio head, and a second carrier may be assigned to a second set of radio ports communicably coupled to a corresponding second plurality of antennae of the access node via the radio head, wherein the second set of radio ports comprises a second split portion of the radio head. Thus, a first composite power level available to the first carrier is based on the number of radio ports in the first set of radio ports, and a second composite power level available to the second carrier is based on a number of radio ports in the second set of radio ports. The threshold against which the power level is compared may be based on the difference. For example, the difference may exceed a second threshold, and the threshold power level may be set based on when the difference does not exceed the second threshold. The threshold may further be based on a weighted power requirement of one or more carriers. A power requirement of a carrier may be weighted on, for example, a usage of the carrier, whether or not the carrier is a component carrier in a carrier aggregation mode of operation, whether or not the carrier is serving a relay, a throughput of additional wireless devices on the carrier, a priority of the carrier (based on, for example, a throughput or propagation characteristic of the carrier), etc. Alternatively or in addition, a priority of a carrier may be based on the frequency (or band class) occupied by a carrier. For example, a carrier may have different propagation and throughput characteristics than another carrier operating within a different frequency or band class.

At 620, upon determining that the first composite power level is lower than a threshold, a split of the radio head is changed or adjusted such that the first composite power level meets the threshold. Changing the split of the radio head comprises changing a number of radio ports in each of the first and second split portion, such that the first composite power level available to the first carrier is increased, and the second composite power level available to the second carrier is reduced. For example, changing the split of the radio head comprises increasing a number of radio ports in the first split portion and reducing a number of radio ports in the second split portion. Thus, if it is determined in step 610 that the first carrier has a disproportionately smaller composite power level available than the second carrier, then the split of the radio head is changed such that a more even split of power is made available to each carrier. Alternatively or in addition, the composite power available to the first carrier is increased until a power requirement of the first carrier is met, by increasing a number of radio ports available the first carrier.

Figure 7A:
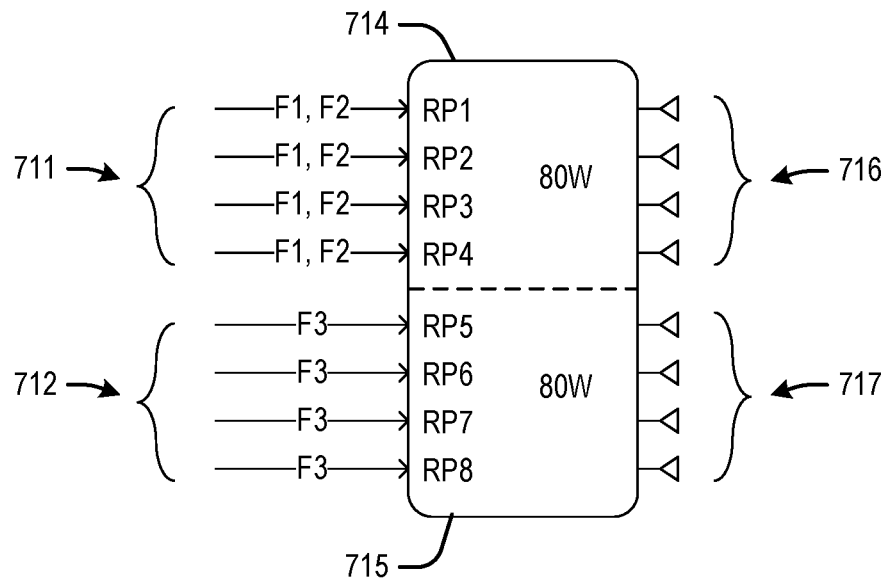
FIGS. 7A-7B depict exemplary assignments of three carriers to radio ports of a split radio head.
Figure 7B:
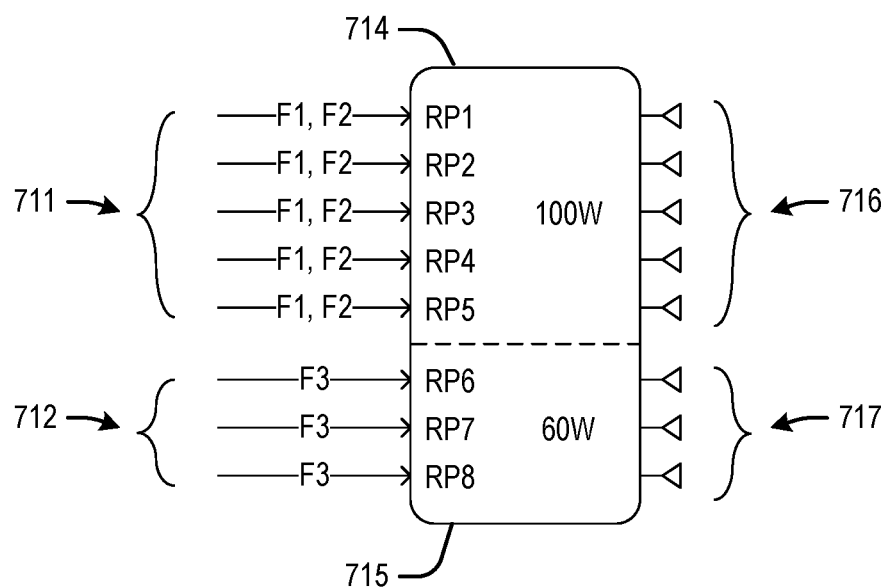

FIGS. 7A-7B depict exemplary assignments of three carriers to radio ports of a split radio head. In this exemplary embodiment, a radio head of an access node houses 8 radio ports labeled RP1 to RP8, along with transceivers and additional components (not shown) that enable communication via a plurality of antennae 716, 717. With respect to FIG. 7A, the radio head may be "split" or divided into two portions 714 and 715, such that the radio ports are divided into two sets, a first set of radio ports comprising RP1-RP4 and a second set of radio ports comprising RP5-RP6. Further, each set of radio ports is coupled to a corresponding set of antennae. For example, antennae 716 are communicatively coupled to the first set of radio ports, and antennae 717 are connected to the second set of radio ports. Further, a first set of carriers 711 comprising F1 and F2 are assigned to each radio port in the first split portion 714, enabling deployment of carriers F1 and F2 from antennae 716, and a second set of carriers 712 comprising just one carrier F3 is assigned to each radio port in the second split portion 715, enabling deployment of carrier F3 from antennae 717.

Similar to the 8T8R radio head of FIGS. 4 and 5, a total power of the radio head is 160 W, such that each portion 714, 715 is configured to provide 80 W, with the total power being divided evenly between the radio ports. For example, the first split portion 714 is able to utilize 50% of the total power of the radio head, and is further able to utilize 100% of the bandwidth at any given time (i.e., instantaneous bandwidth or IBW). Similarly, the second split portion 715 is able to utilize 50% of the total power of the radio head, and is further able to utilize 100% of the IBW. In other words, each radio port RP1-RP4 is configured to provide a maximum power per port of 20 W per radio port. Thus, assigning a single carrier to a radio port results in a maximum power of 20 W per carrier per port, assigning two carriers to a radio port results in a maximum power of 10 W per carrier per port, assigning three carriers to a radio port results in a maximum power of 6.67 W per carrier per port, and assigning four carriers to a radio port results in a maximum power of 5 W per carrier per port. Further in this embodiment, each of carriers F1 and F2 is assigned to all 4 radio ports RP1-RP4. Thus, each carrier is able to access approximately 40 W of composite power (given 4 ports at 10 W per carrier per port). Further, carrier F3 is assigned to all 4 radio ports RP5-RP8, and is able to access 80 W of composite power (given 4 ports at 20 W per carrier per port). Consequently, per the method of FIG. 6, it may be determined that a power level available to carriers F1 and/or F2 is lower than a threshold. For example, the threshold may be based on a difference between a first power level available to carriers F1 or F2, that is, 40 W, and a second power level available to carrier F3, that is, 80 W. A difference-based threshold may be defined to minimize the difference between the two power levels. Thus, each split portion 714, 715 may be adjusted to minimize the difference, and to increase the power level available to carriers F1 and/or F2. FIG. 7B illustrates a modified split of the radio head portions 714, 715, by changing a number of radio ports in split portion 714 to 5 radio ports RP1-RP5, and 3 radio ports in split portion 715 to RP6-RP8. Further, each of carriers F1 and F2 is assigned to all 5 radio ports RP1-RP5. Consequently, each carrier F1, F2 is able to access approximately 50 W of power (given 5 ports at 10 W per carrier per port). Further, carrier F3 is assigned to all 3 radio ports RP6-RP8, and is able to access 60 W of power (given 3 ports at 20 W per carrier per port). As a result, a difference between the first and second power levels is now 60 W-50 W=10 W. Thus, the split of the radio head is changed such that a more even split of power is made available to each carrier.

Figure 8A:
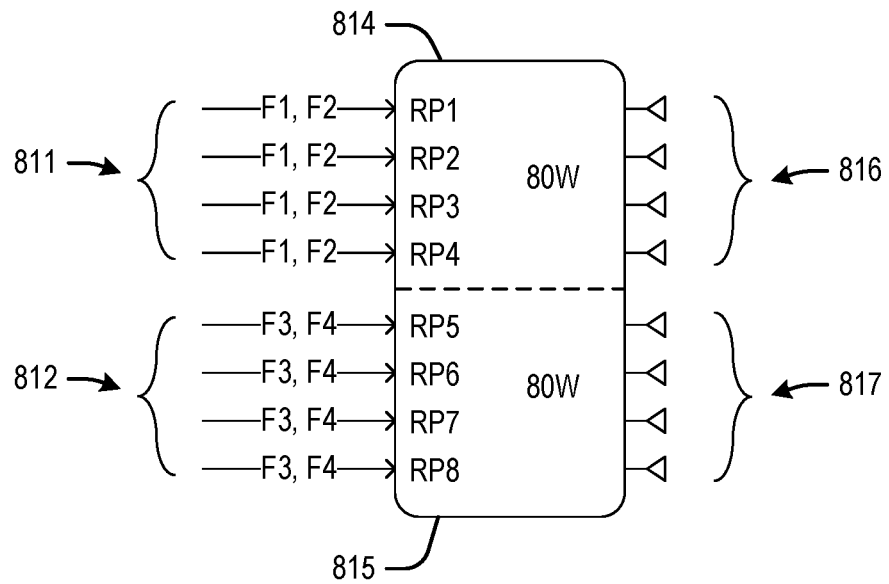
FIGS. 8A-8B depict exemplary assignments of four carriers to radio ports of a split radio head.
Figure 8B:
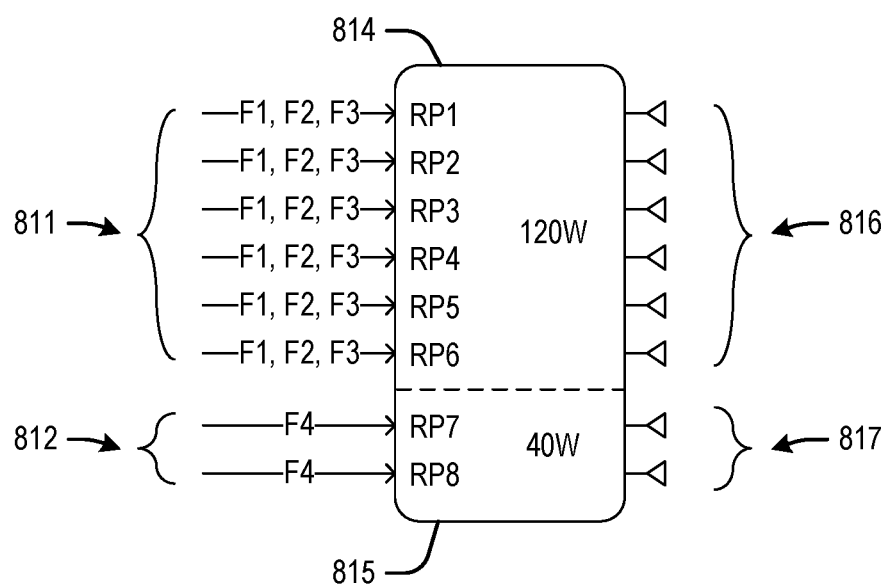

In another exemplary embodiment, the split of the radio head may be changed for reasons other than minimizing a difference between power levels available to a carrier. FIGS. 8A-8B depict this using four carriers to radio ports of an exemplary radio head split in two different ways. In this exemplary embodiment, a radio head of an access node houses 8 radio ports labeled RP1 to RP8, along with transceivers and additional components (not shown) that enable communication via a plurality of antennae 816, 817. With respect to FIG. 8A, the radio head may be "split" or divided into two portions 814 and 815, such that the radio ports are divided into two sets, a first set of radio ports comprising RP1-RP4 and a second set of radio ports comprising RP5-RP6. Further, each set of radio ports is coupled to a corresponding set of antennae. For example, antennae 816 are communicatively coupled to the first set of radio ports, and antennae 817 are connected to the second set of radio ports. Further, a first set of carriers 811 comprising F1 and F2 are assigned to each radio port in the first split portion 814, enabling deployment of carriers F1 and F2 from antennae 816, and a second set of carriers 812 comprising carriers F3 and F4 are assigned to each radio port in the second split portion 815, enabling deployment of carriers F3 and F4 from antennae 817.

Similar to the radio head of FIG. 7A, a total power of the radio head is 160 W, such that each portion 814, 815 is configured to provide 80 W, with the total power being divided evenly between the radio ports. For example, the first split portion 814 is able to utilize 50% of the total power of the radio head, and is further able to utilize 100% of the bandwidth at any given time (i.e., instantaneous bandwidth or IBW). Similarly, the second split portion 815 is able to utilize 50% of the total power of the radio head, and is further able to utilize 100% of the IBW. In other words, each radio port RP1-RP4 is configured to provide a maximum power per port of 20 W per radio port. Thus, assigning a single carrier to a radio port results in a maximum power of 20 W per carrier per port, assigning two carriers to a radio port results in a maximum power of 10 W per carrier per port, assigning three carriers to a radio port results in a maximum power of 6.67 W per carrier per port, and assigning four carriers to a radio port results in a maximum power of 5 W per carrier per port. Further in this embodiment, each of carriers F1 and F2 is assigned to all 4 radio ports RP1-RP4. Thus, each carrier is able to access 40 W of power (given 4 ports at 10 W per carrier per port). Further, each of carriers F3 and F4 is assigned to all 4 radio ports RP5-RP8. Thus, each carrier is able to access 40 W of power (given 4 ports at 10 W per carrier per port).

Consequently, it is evident that a difference between the power level available to carriers F1 and F2, and the power level available to carriers F3 and F4 is zero. In other words, the power is evenly balanced. Similarly, FIG. 8B illustrates a modified split of the radio head portions 814, 815, with split portion 814 comprising 6 radio ports RP1-RP6, and split portion 815 comprising 2 radio ports RP6-RP8. Further, each of carriers F1, F2, and F3 is assigned to all 6 radio ports RP1-RP6, and carrier F4 is assigned to radio ports RP7 and RP8. Consequently, each carrier F1, F2, F3 is able to access 40 W of power (given 6 ports at 6.67 W per carrier per port). Further, carrier F4 is assigned to radio ports RP7-RP8, and is also able to access 40 W of power (given 2 ports at 20 W per carrier per port). As a result, a difference between the first and second power levels remains at zero, with the only difference being that carriers F1, F2, and F3 are able to access more radio ports than carrier F4. Such a split may be useful in comparison with FIG. 8A for numerous reasons. For example, carriers F1, F2, and F3 may be component carriers in a carrier aggregation mode of operation. Thus, additional antenna ports are required for transmission of these carriers. Alternatively or in addition, the additional antenna ports are used to deploy/transmit these three carriers in a formed beam or towards a different part of the sector served by antennae 816. Other advantages of changing the split of the radio head may be contemplated by those having ordinary skill in the art in light of this disclosure.

Figure 9:
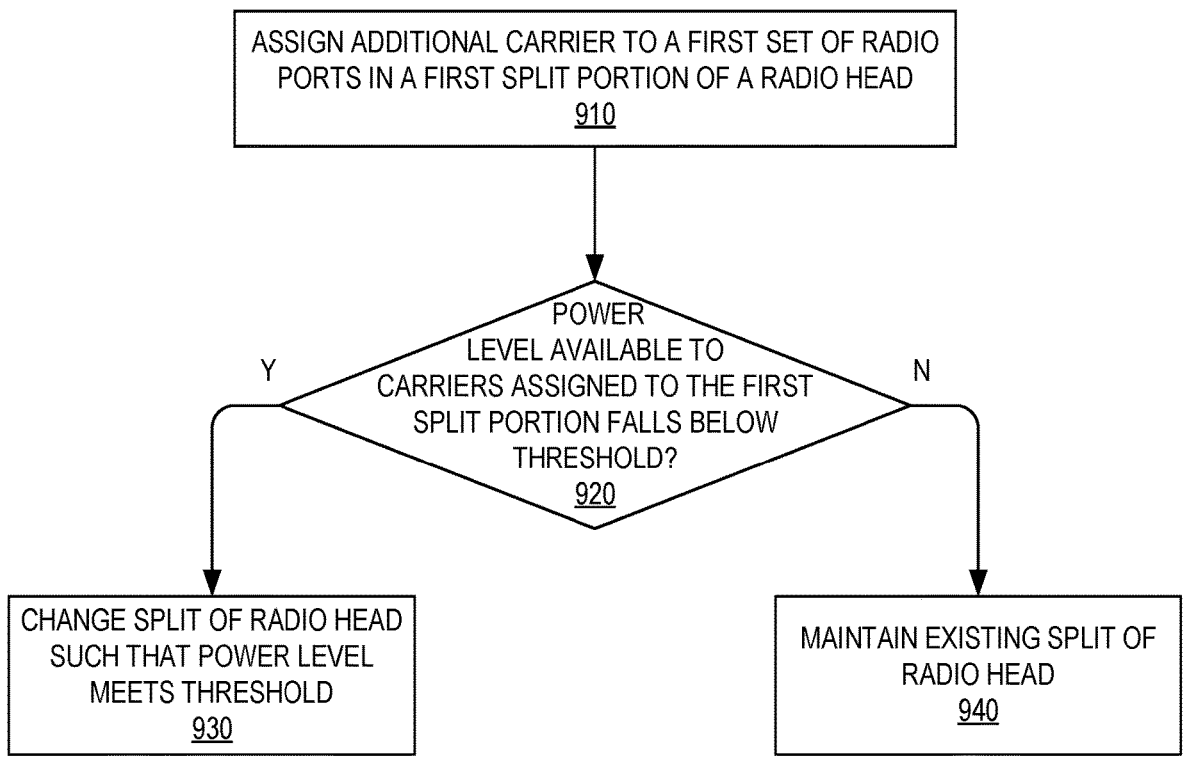
FIG. 9 depicts an exemplary method for changing a split of a radio head.

FIG. 9 depicts an exemplary method for changing a split of a radio head upon determining that power levels available to a carrier fall below a threshold (or, that a power level difference between two carriers exceeds a threshold). The method of FIG. 9 may be implemented by a processing node coupled to an access node (such as access node 110), a controller node (such as controller node 104), or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, an additional carrier is assigned to a first set of radio ports in a split portion of a radio head. The additional carrier may be assigned to the first set of radio ports in addition to a first one or more carriers deployed by an access node that are assigned to the first set of radio ports. Further, a second one or more carriers deployed by the access node may have been assigned to a second set of radio ports of the radio head. As described herein, the radio head has a maximum power level comprising at least a sum of the power levels of the first and second split portions. Thus, it is assumed that the power level available to the first one or more carriers, without considering the additional carrier, meets a threshold. For example, a difference between a first power level available to the first one or more carriers and a second power level available to the second one or more carriers is less than a threshold, as illustrated in the embodiments of FIGS. 8A-8B.

However, upon adding the third carrier to the first set of radio ports, a power level per carrier per radio port may be reduced for the first one or more carriers. This is because, as described above and with reference to FIGS. 4-5, adding additional carriers to a radio port can reduce a power available to the carriers, despite the carriers being able to access the maximum IBW of the radio port. Thus, at 920, the power level available to carriers assigned to the first split portion of the radio head is monitored and, if the power level does not fall below a threshold, the existing split is maintained at 940. However, if the power level drops to below a threshold, a split of the radio head may be changed at 930. For example, changing the split of the radio head comprises changing a number of radio ports in each of the first and second split portion by increasing a number of radio ports in the first split portion and reducing a number of radio ports in the second split portion. This method may be repeated for additional carriers added to the first set of radio ports, triggering a change in the split of the radio head further increasing the number of radio ports in the first split portion and further reducing the number of radio ports in the second split portion.

Figure 10A:
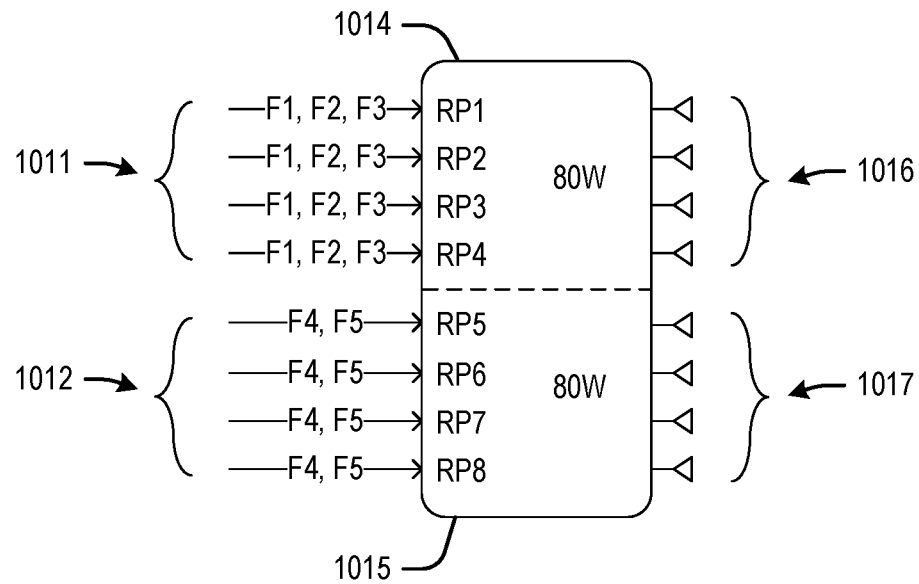
FIGS. 10A-10B depict exemplary assignments of five carriers to radio ports of a split radio head.
Figure 10B:
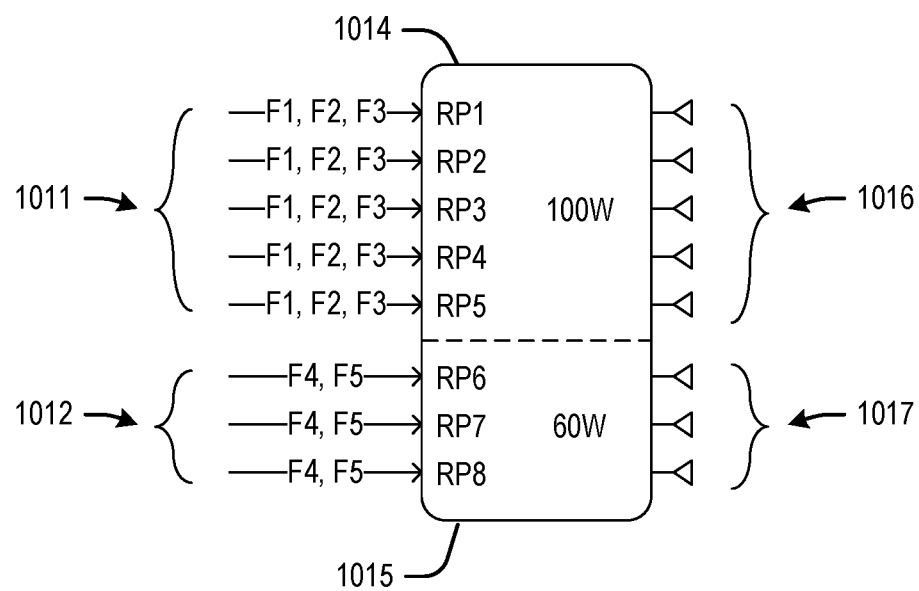

FIGS. 10A-10B depict exemplary assignments of five carriers to radio ports of a split radio head, with the split being changed per the method of FIGS. 9 and 6. In this exemplary embodiment, a radio head of an access node houses 8 radio ports labeled RP1 to RP8, along with transceivers and additional components (not shown) that enable communication via a plurality of antennae 1016, 1017. With respect to FIG. 10A, the radio head may be "split" or divided into two portions 1014 and 1015, such that the radio ports are divided into two sets, a first set of radio ports comprising RP1-RP4 and a second set of radio ports comprising RP5-RP6. Further, each set of radio ports is coupled to a corresponding set of antennae. For example, antennae 1016 are communicatively coupled to the first set of radio ports, and antennae 1017 are connected to the second set of radio ports. Further, a first set of carriers 1011 comprising F1, F2, and F3 are assigned to each radio port in the first split portion 1014, enabling deployment of carriers F1, F2, F3 from antennae 1016. Further, a second set of carriers 1012 comprising carriers F4 and F5 is assigned to each radio port in the second split portion 1015, enabling deployment of carriers F4, F5 from antennae 1017.

Similar to the 8T8R radio head described herein, a total power of the radio head is 160 W, such that each portion 1014, 1015 is configured to provide 80 W, with the total power being divided evenly between the radio ports. For example, the first split portion 1014 is able to utilize 50% of the total power of the radio head, and is further able to utilize 100% of the bandwidth at any given time (i.e., instantaneous bandwidth or IBW). Similarly, the second split portion 1015 is able to utilize 50% of the total power of the radio head, and is further able to utilize 100% of the IBW. In other words, each radio port RP1-RP4 is configured to provide a maximum power per port of 20 W per radio port. Thus, assigning a single carrier to a radio port results in a maximum power of 20 W per carrier per port, assigning two carriers to a radio port results in a maximum power of 10 W per carrier per port, assigning three carriers to a radio port results in a maximum power of 6.67 W per carrier per port, and assigning four carriers to a radio port results in a maximum power of 5 W per carrier per port. Further in this embodiment, each of carriers F1, F2, and F3 is assigned to all 4 radio ports RP1-RP4, such that each carrier F1, F2, F3 is able to access 26.67 W of power (given 4 ports at 6.67 W per carrier per port). Further, each of carriers F4 and F5 is assigned to all 4 radio ports RP5-RP8, and is able to access 40 W of power (given 4 ports at 20 W per carrier per port).

Consequently, it may be determined that a power level available to carriers F1, F2, and/or F3 is lower than a threshold. For example, the threshold may be based on a difference between a first power level available to carriers F1, F2, F3, that is, 26.67 W, and a second power level available to carriers F4, F5, that is, 40 W. A difference-based threshold may be defined to minimize the difference between the two power levels. Alternatively or in addition, it may be determined that 26.67 W per carrier in the first set of carriers 1011 is below a threshold power requirement for these carriers. Thus, each split portion 1014, 1015 may be adjusted to minimize the difference, and to increase the power level available to carriers F1, F2, and F3. FIG. 10B illustrates a modified split of the radio head portions 1014, 1015, by changing a number of radio ports in split portion 1014 to 5 radio ports RP1-RP5, and 3 radio ports in split portion 1015 to RP6-RP8. Further, each of carriers F1, F2, and F3 is assigned to all 5 radio ports RP1-RP5. Consequently, each carrier F1, F2, F3 is able to access approximately 33.33 W of power (given 5 ports at 6.67 W per carrier per port). Further, each of carriers F4 and F5 is assigned to all 3 radio ports RP6-RP8, and is able to access 30 W of power (given 3 ports at 10 W per carrier per port). As a result, a difference between the first and second power levels is now 33.33 W-30 W=3.33 W. Thus, the split of the radio head is changed such that a more even split of power is made available to each carrier.

Figure 11:
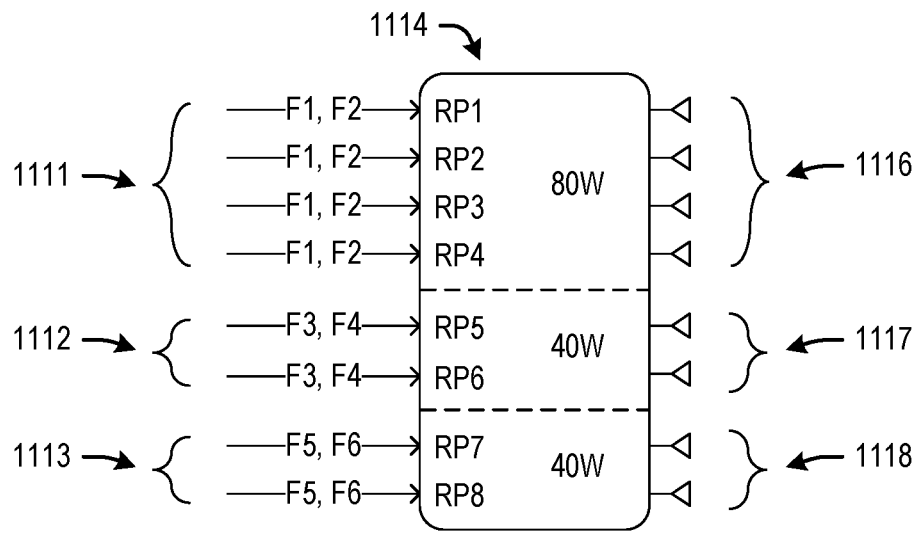
FIG. 11 depicts an exemplary assignment of carriers to radio ports of a radio head split into three portions.

As wireless networks become more heterogeneous, additional carriers may be deployed to enable communication via different frequencies. Further, power threshold may get smaller as the number of required carriers increases. In such situations, splitting a radio head into additional portions may be beneficial. FIG. 11 depicts an exemplary assignment of carriers to radio ports of a radio head split into three portions. In this exemplary embodiment, a radio head 1114 of an access node houses 8 radio ports labeled RP1 to RP8, along with transceivers and additional components (not shown) that enable communication via a plurality of antennae 1116, 1117, 118. Further, the radio head 1114 may be "split" or divided into three portions, such that the radio ports are divided into three sets, a first set of radio ports comprising RP1-RP4, a second set of radio ports comprising RP5-RP6, and a third set of radio ports comprising RP7-RP8. Further, each set of radio ports is coupled to a corresponding set of antennae. For example, antennae 1116 are communicatively coupled to the first set of radio ports, antennae 1117 are connected to the second set of radio ports, and antennae 1118 are connected to the third set of radio ports.

Further, a first set of carriers 1111 comprising F1, F2 are assigned to each radio port in the first split portion, enabling deployment of carriers F1, F2 from antennae 1116, a second set of carriers 1112 comprising carriers F3 and F4 is assigned to each radio port in the second split portion, enabling deployment of carriers F3, F4 from antennae 1117, and a third set of carriers 1113 comprising carriers F5 and F6 is assigned to each radio port in the third split portion, enabling deployment of carriers F5, F6 from antennae 1118. If a total power of the radio head 1114 is 160 W, the first portion (comprising radio ports RP1-RP4) may be configured to provide 80 W, the second portion (comprising radio ports RP5-RP6) may be configured to provide 40 W, and the third portion (comprising radio ports RP7-RP8) may be configured to provide 40 W. Further in this embodiment, each of carriers F1, F2 is assigned to all 4 radio ports RP1-RP4, such that each carrier F1, F2 is able to access 40 W of power (given 4 ports at 10 W per carrier per port). Further, each of carriers F3 and F4 assigned to radio ports RP5-RP6 is able to access 40 W of power (given 2 ports at 20 W per carrier per port). Similarly, each of carriers F5 and F6 assigned to radio ports RP7-RP8 is able to access 40 W of power (given 2 ports at 20 W per carrier per port).

This above-described configuration may be ideal if carriers F1 and F2 have a higher priority or a higher power requirement. Alternatively, it may be determined that a power level available to carriers F3, F4, F5, or F6 is lower than a threshold, and the split of radio portion 1114 may be adjusted using the methods described herein.

Figure 12A:
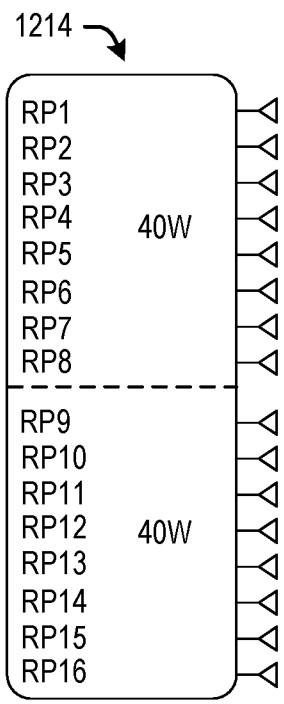
FIGS. 12A-12B depict exemplary split radio ports with varying numbers of radio ports and antennae.
Figure 12B:
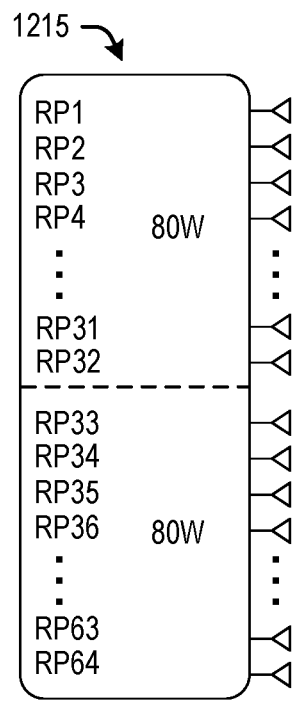

As described above, smaller cells with varying numbers of antennae are increasingly being utilized, in addition to or as alternatives to the 8T8R configurations described herein. The described systems and methods are applicable to any configuration of radio heads and antennae, without being limited to the 8T8R embodiments described above. For example, similar operations for changing a split of a radio head and assigning carriers to radio ports can be performed for the exemplary radio heads of FIGS. 12A-12B. FIG. 12A illustrates a radio head 1214 comprising 16 radio ports correspondingly coupled to 16 antennae, and FIG. 12B illustrates a radio head 1215 comprising 64 radio ports correspondingly coupled to 64 antennae. Other configurations can be contemplated by those having ordinary skill in the art in light of this disclosure.

As described above, a weighted power requirement of a carrier may be based on the carrier being a component carrier in a carrier aggregation mode of operation. The carrier aggregation mode utilizes one carrier as a primary carrier, and the other carrier as the secondary carrier, and resources from the one carrier and the other carrier are combined to enable communications between an access node and one or more wireless devices attached thereto. Thus, a component carrier may have a higher-weighted power requirement than other carriers, such as non-aggregated carriers.

Figure 13:
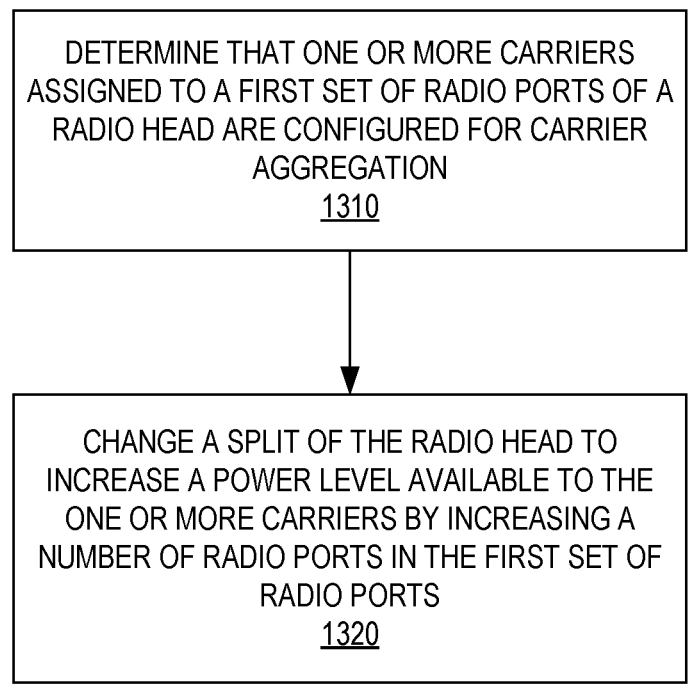
FIG. 13 depicts an exemplary method for changing a split of a radio head for carrier aggregation.

FIG. 13 depicts an exemplary method for changing a split of a radio head for carrier aggregation. The method of FIG. 9 may be implemented by a processing node coupled to an access node (such as access node 110), a controller node (such as controller node 104), or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1310, it is determined that one or more carriers assigned to a first set of radio ports of a radio head are configured for carrier aggregation. Then, at 1320, a split of the radio head is changed to increase a power level available to those carriers. The split may be changed by increasing a number of radio ports available in the first set of radio ports, as further illustrated in FIGS. 14A-14B. In this exemplary embodiment, a radio head of an access node houses 8 radio ports labeled RP1 to RP8, along with transceivers and additional components (not shown) that enable communication via a plurality of antennae, as further described above. With respect to FIG. 14A, the radio head may be "split" or divided into two portions 1414 and 1415, such that the radio ports are divided into two sets, a first set of radio ports comprising 5 radio ports RP1-RP5, and a second set of radio ports comprising RP6-RP8. Further, a first set of carriers F1, F2 are assigned to each radio port in the first split portion 1414, enabling deployment of carriers F1 and F2 from the corresponding antennae, while carrier F3 is assigned to each radio port in the second split portion 1415. This is identical to the embodiment of FIG. 7B, wherein each carrier F1, F2 is able to access approximately 50 W of composite power (given 5 ports at 10 W per carrier per port), and carrier F3 is able to access 60 W of composite power (given 3 ports at 20 W per carrier per port). As a result, a difference between the first and second composite power levels is now 60 W-50 W=10 W.

Figure 14A:
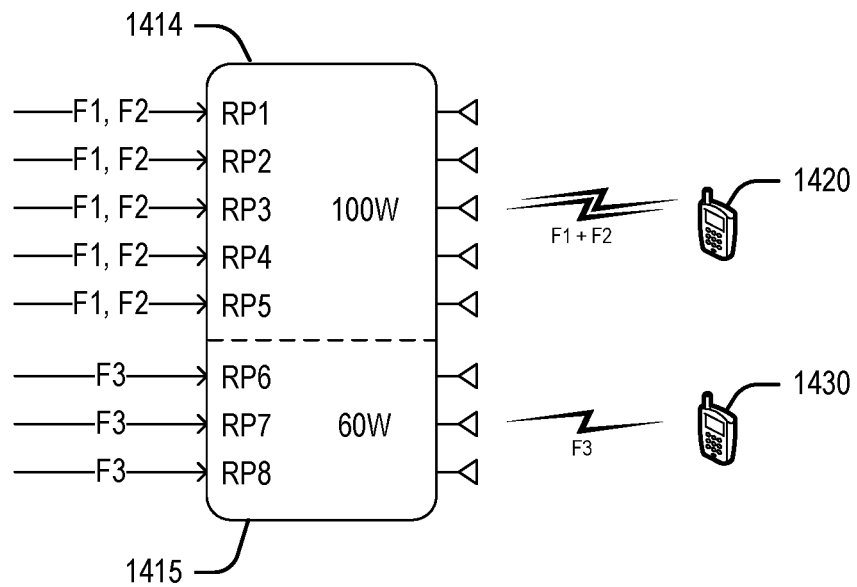
FIGS. 14A-14B depict exemplary assignments of aggregated carriers to radio ports of a split radio head.
Figure 14B:
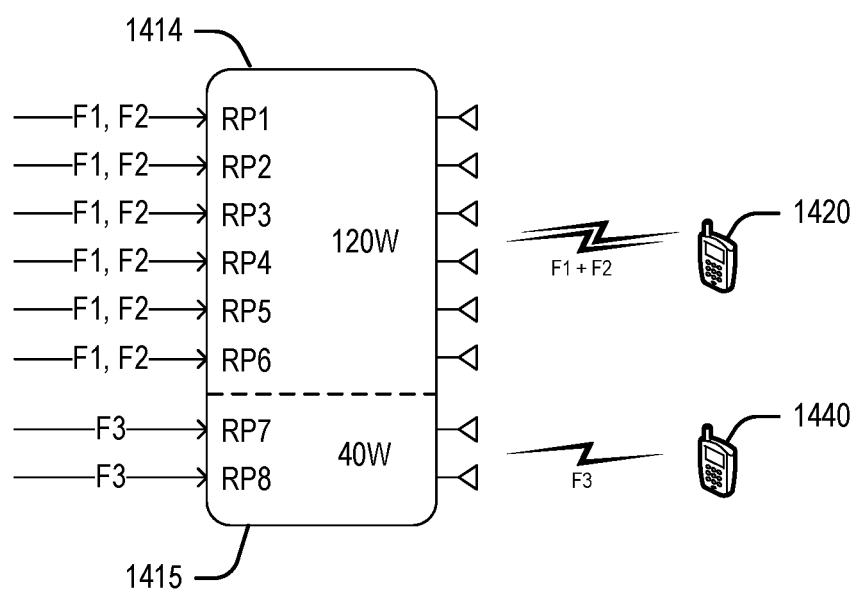

However, as illustrated in FIG. 14A, carriers F1 and F2 are being used in a carrier aggregation mode of operation to communicate with a wireless device 1420, while carrier F3 is being used for a normal mode of operation to communicate with wireless device 1430. If carriers F1 and F2 were to be prioritized (i.e. given a higher minimum power requirement) due to being utilized for carrier aggregation, then it may be determined that the available composite power of 50 W per carrier in first split portion 1414 is below a threshold. Thus, as shown in FIG. 14B, each split portion 1414, 1415 may be adjusted to minimize the difference, and to increase the power level available to carriers F1 and/or F2. Radio head portions 1414, 1415 may be changed by changing a number of radio ports in split portion 1414 to 6 radio ports RP1-RP6, and 2 radio ports in split portion 1415 to RP7-RP8. Further, each of carriers F1 and F2 is now assigned to all 6 radio ports RP1-RP6. Consequently, each carrier F1, F2 is able to access approximately 60 W of composite power (given 6 ports at 10 W per carrier per port). In addition, carrier F3 is assigned to radio ports RP7-RP8, and is able to access 40 W of composite power (given 2 ports at 20 W per carrier per port). As a result, carriers F1+F2 being utilized for carrier aggregation have been provided a greater available power than carrier F3.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for assigning carriers to radio ports in a wireless network, the method comprising:

assigning a first carrier deployed by an access node to a first set of radio ports communicably coupled to a corresponding first plurality of antennae of the access node via a radio head, wherein the first set of radio ports comprises a first split portion of the radio head;

assigning a second carrier deployed by the access node to a second set of radio ports communicably coupled to a corresponding second plurality of antennae of the access node via the radio head, wherein the second set of radio ports comprises a second split portion of the radio head;

determining a difference between a first power level available to the first carrier via the first set of radio ports and a second power level available to the second carrier via the second set of radio ports; and changing a split of the radio head such that the difference between the first and second power levels is minimized.

2. The method of claim 1, further comprising instructing the access node to deploy the first and second carriers respectively via the first and second plurality of antennae.

3. The method of claim 1, wherein changing the split of the radio head comprises changing a number of radio ports in each of the first and second split portions.

4. The method of claim 3, further comprising:

assigning a third carrier to the first set of radio ports, wherein:

one half of the first power level is available to each of the first and third carriers via the first set of radio ports, and changing the split of the radio head comprises increasing a number of radio ports in the first split portion and reducing a number of radio ports in the second split portion.

5. The method of claim 4, further comprising:

assigning a fourth carrier to the first set of radio ports, wherein:

changing the split of the radio head further comprises further increasing the number of radio ports in the first split portion; and further reducing the number of radio ports in the second split portion.

6. The method of claim 1, wherein changing a split of the radio head is based on a weighted power requirement of each of the first and second carriers.

7. The method of claim 6, wherein:

the first carrier has a greater-weighted power requirement than the second carrier, and changing a split of the radio head comprises:

increasing a number of radio ports in the first split portion; and reducing a number of radio ports in the second split portion.

8. The method of claim 6, wherein the weighted power requirement for each of the first and second carriers is based on at least a usage of said each of the first and second carriers.

9. The method of claim 6, wherein the weighted power requirement is based on at least one of the first and second carriers being a component carrier in a carrier-aggregation mode of operation.

10. The method of claim 1, wherein the radio head is configured with a maximum bandwidth.

11. The method of claim 10, wherein each split portion of the radio head is configured to utilize the maximum bandwidth.

12. A system for assigning carriers to radio ports in a wireless network, the system comprising:

an access node configured to deploy a plurality of carriers;

a radio head coupled to the access node, the radio head comprising a plurality of radio ports coupled to a corresponding plurality of antennae of the access node; and a processor coupled to the access node, the processor configured to perform operations comprising:
  assigning a first carrier deployed by the access node to a first set of radio ports of the radio head;
  assigning a second carrier deployed by the access node to a second set of radio ports of the radio head;
  determining that a first power level available to the first carrier via the first set of radio ports is lower than a threshold; and
  changing a split of the radio head such that the first power level meets the threshold,
  wherein changing the split of the radio head comprises increasing a number of radio ports in the first set of radio ports.

13. The system of claim 12, wherein:
the first set of radio ports comprises a first split portion of the radio head, and
the second set of radio ports comprises a second split portion of the radio head.

14. The system of claim 13, wherein the radio head has a maximum power level comprising at least a sum of the first power level associated with the first set of radio ports and a second power level associated with the second set of radio ports.

15. The system of claim 14, wherein changing the split of the radio head further comprises reducing a number of radio ports in the second set of radio ports, such that the first power level is increased and the second power level is decreased.

16. The system of claim 12, wherein determining that the first power level is lower than the threshold further comprises obtaining a weighted power requirement of the first carrier.

17. The system of claim 12, wherein determining that the first power level is lower than the threshold further comprises determining that a difference between the first power level available to the first carrier via the first set of radio ports and a second power level available to the second carrier via the second set of radio ports exceeds a threshold.

18. The system of claim 17, wherein changing the split of the radio head such that the first power level meets the threshold further comprises changing the numbers of radio ports in the first and second sets of radio ports such that the difference between the first and second power levels is minimized.

19. A processing node for assigning carriers to radio ports in a wireless network, the processing node being configured to perform operations comprising:

assigning a first carrier deployed by an access node to a first set of radio ports communicably coupled to a corresponding first plurality of antennae of the access node via a radio head, wherein the first set of radio ports comprises a first split portion of the radio head;

assigning a second carrier deployed by the access node to a second set of radio ports communicably coupled to a corresponding second plurality of antennae of the access node via the radio head, wherein the second set of radio ports comprises a second split portion of the radio head;

determining a difference between a first power level available to the first carrier via the first set of radio ports and a second power level available to the second carrier via the second set of radio ports; and changing a split of the radio head such that the difference between the first and second power levels is minimized, wherein the radio head is configured with a maximum bandwidth, and wherein each split portion is configured to utilize the maximum bandwidth.

20. The processing node of claim 19, wherein changing the split of the radio head comprises changing a number of radio ports in the first and second sets of radio ports.

* * * * *